US012675080B2

(12) United States Patent
Nomura et al.

(10) Patent No.: US 12,675,080 B2
(45) Date of Patent: Jul. 7, 2026

(54) ELECTRONIC DEVICE, CONTROL METHOD FOR ELECTRONIC DEVICE, AND STORAGE MEDIUM

(71) Applicant: CASIO COMPUTER CO., LTD., Tokyo (JP)

(72) Inventors: Keiichi Nomura, Uenohara (JP); Tomoo Kasuo, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 371 days.

(21) Appl. No.: 18/465,299

(22) Filed: Sep. 12, 2023

(65) Prior Publication Data

US 2024/0085859 A1 Mar. 14, 2024

(30) Foreign Application Priority Data

Sep. 14, 2022 (JP) ................................. 2022-145741

(51) Int. Cl.
*G04G 21/02* (2010.01)

(52) U.S. Cl.
CPC .................................... *G04G 21/02* (2013.01)

(58) Field of Classification Search
CPC ...................................................... G04G 21/02
USPC .......................................................... 340/669
See application file for complete search history.

(56) References Cited

U.S. PATENT DOCUMENTS

2002/0183027 A1* 12/2002 Husted ................... H04B 1/109 455/234.1
2009/0059730 A1* 3/2009 Lyons .................... G04G 21/08 368/69
2014/0275852 A1* 9/2014 Hong ................... A61B 5/0002 600/479
2015/0301608 A1* 10/2015 Nagaraju .............. G06F 1/1694 345/156
2016/0026211 A1* 1/2016 Luna ..................... G06F 3/0634 361/679.03
2016/0041531 A1* 2/2016 Mackie .................. A61B 5/681 368/80
2018/0325451 A1* 11/2018 Liu .................... A61B 5/02055
2019/0369569 A1* 12/2019 Olsen .................... G06T 7/0002
2020/0367827 A1* 11/2020 Min ........................... G06F 3/01
2023/0210417 A1* 7/2023 Al-Ali .................. A61B 5/6831 600/323

(Continued)

FOREIGN PATENT DOCUMENTS

JP H11223685 A 8/1999
JP 2014190965 A 10/2014
JP 2016178493 A 10/2016

(Continued)

OTHER PUBLICATIONS

Notice of Reasons for refusal dated Aug. 6, 2024 received in Japanese Patent Application No. JP 2022-145741.

*Primary Examiner* — Travis R Hunnings
(74) *Attorney, Agent, or Firm* — Scully, Scott, Murphy & Presser, P.C.

(57) ABSTRACT

An electronic device that is used by being worn on a body of a user includes a vibrator, a sensor and a processor. The vibrator vibrates the electronic device. The sensor detects a physical quantity corresponding to an intensity of the vibration of the electronic device. The processor determines a wear state of the electronic device on the body of the user based on the detected physical quantity.

17 Claims, 5 Drawing Sheets

(56) References Cited

U.S. PATENT DOCUMENTS

2024/0176040 A1 * 5/2024 Hikosaka ........... A61B 5/02416

FOREIGN PATENT DOCUMENTS

WO 2015166990 A1 11/2015
WO 2018110432 A1 6/2018

* cited by examiner

ELECTRONIC DEVICE, CONTROL METHOD FOR ELECTRONIC DEVICE, AND STORAGE MEDIUM

REFERENCE TO RELATED APPLICATIONS

This application is based upon and claims the benefit of priority from the prior Japanese Patent Application No. 2022-145741, filed on Sep. 14, 2022, the entire contents of which are incorporated herein by reference.

TECHNICAL FIELD

The present disclosure relates to an electronic device, a control method for an electronic device and a storage medium.

DESCRIPTION OF RELATED ART

There has been known a technique of, in an electronic device that is used by being worn on the body of a user, determining whether the electronic device is being worn on the body of the user on the basis of the intensity of reflected and received light of light emitted from a light emitter (e.g., WO 2015/166990 A1).

SUMMARY OF THE INVENTION

According to a first aspect of the present disclosure, there is provided an electronic device that is used by being worn on a body of a user, including:

- a vibrator that vibrates the electronic device,
- a sensor that detects a physical quantity corresponding to an intensity of the vibration of the electronic device; and
- a processor that determines a wear state of the electronic device on the body of the user based on the detected physical quantity.

According to a second aspect of the present disclosure, there is provided a control method for an electronic device, including:

- detecting a physical quantity corresponding to an intensity of vibration of the electronic device; and
- determining a wear state of the electronic device on a body of a user based on the detected physical quantity.

According to a third aspect of the present disclosure, there is provided a non-transitory computer-readable storage medium storing a program that causes, of an electronic device that is used by being worn on a body of a user and including a vibrator that vibrates the electronic device and a sensor that detects a physical quantity corresponding to an intensity of the vibration of the electronic device, a computer to:

- determine a wear state of the electronic device on the body of the user based on the detected physical quantity.

BRIEF DESCRIPTION OF DRAWINGS

The accompanying drawings are not intended as a definition of the limits of the present disclosure but illustrate embodiments of the present disclosure, and together with the general description given above and the detailed description of embodiments given below, serve to explain the principles of the present disclosure, wherein.

DETAILED DESCRIPTION

Hereinafter, one or more embodiments of the present disclosure will be described with reference to the drawings.

Configuration of Electronic Timepiece

Figure 1:
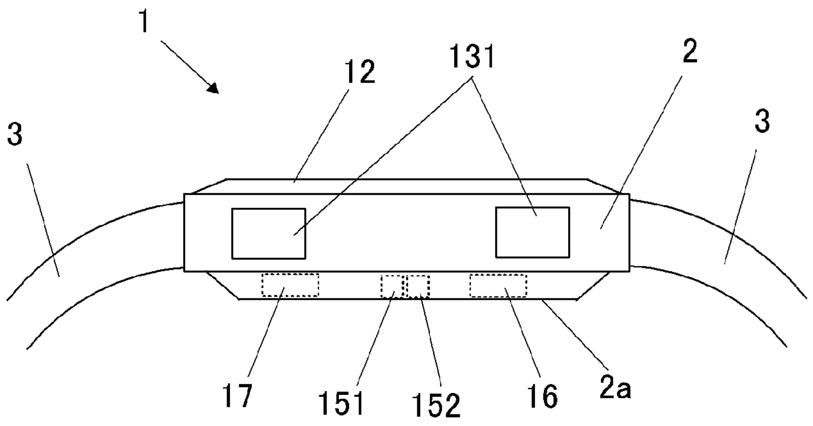
FIG. 1 is a side view of an electronic timepiece.

FIG. 1 is a side view of an electronic timepiece 1.

The electronic timepiece 1 (electronic device) is a wristwatch that is used by being worn on a wrist (body) of a user. The electronic timepiece 1 has a main body 2 including a display 12 (notifier) and operation buttons 131 and a belt 3 attached to the main body 2. The electronic timepiece 1 is being worn by the user wrapping the belt 3 around his/her wrist.

The electronic timepiece 1 includes a pulse wave detector 15 (biometric data measurer) in the main body 2. The pulse wave detector 15 detects a pulse wave(s) of the user. The pulse wave detector 15 includes a light emitter 151 and a light receiver 152. The light emitter 151 and the light receiver 152 are disposed on the back surface of the main body 2, namely, near the surface that contacts the user's wrist while the electronic timepiece 1 is being worn by the user. The light emitter 151 emits light from the back surface of the main body 2 toward outside. While the electronic timepiece 1 is being worn by the user, the light emitted from the light emitter 151 is reflected by the skin of the user's wrist. The light receiver 152 is disposed at a point where the light receiver 151 can receive the light reflected by the user's skin. The light incident on the user's skin is partly absorbed by the blood in the blood vessels. Hence, the amount of light that is reflected by the skin and received by the light receiver 152 changes with time, namely, according to change in the blood flow volume associated with pulsation of the heart. The pulse wave detector 15 detects the pulse wave on the basis of the change in the amount of the light received, and outputs a waveform corresponding to the detected pulse wave. A CPU 10 (shown in FIG. 2) measures a pulse rate (heart rate) on the basis of the waveform, and the display 12 displays the measurement result of the pulse rate.

Figure 2:
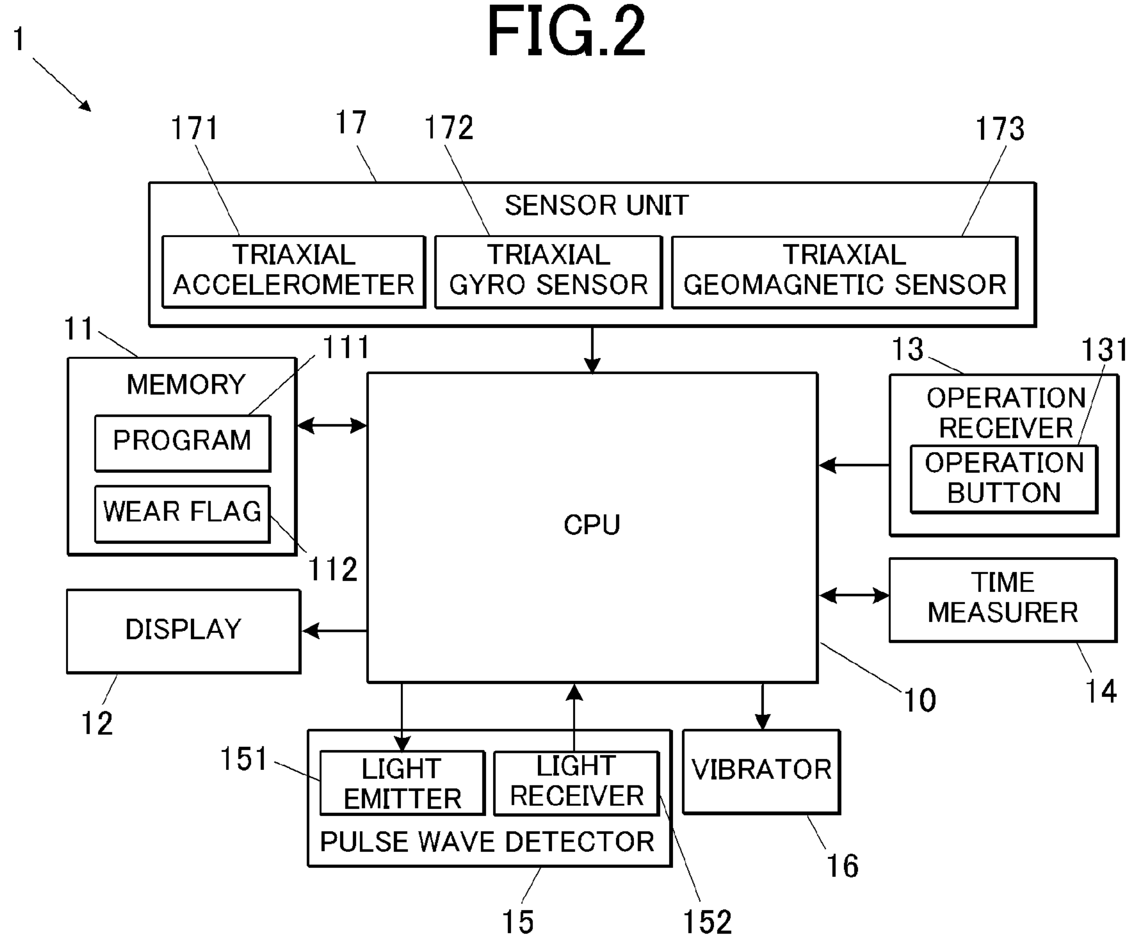
FIG. 2 is a block diagram showing a functional structure of the electronic timepiece.

FIG. 2 is a block diagram showing a functional configuration of the electronic timepiece 1.

The electronic timepiece 1 includes the aforementioned CPU 10 (Central Processing Unit), display 12 and pulse wave detector 15, and further includes a memory 11, an operation receiver 13, a time measurer 14, a vibrator 16 and a sensor unit 17.

The CPU 10 is a processor that reads and executes programs 111 stored in the memory 11 to perform various types of arithmetic processing, thereby controlling operation (actions) of the electronic timepiece 1. The electronic timepiece 1 may have a plurality of circuit elements (e.g., a plurality of CPUs), and these circuit elements may perform a plurality of processes that the CPU 10 of this embodiment performs. In this case, the circuit elements constitute the processor. The circuit elements may be involved in the same process(es) or may independently perform different processes in parallel.

The memory 11 provides a working memory space for the CPU 10 and stores various data. The memory 11 includes, for example, a RAM (Random Access Memory) and a nonvolatile memory. The RAM is used by the CPU 10 for arithmetic processing and also stores temporary data. The nonvolatile memory is, for example, a flash memory, and stores various data as well as the programs 111. The memory 11, which includes the nonvolatile memory, constitutes a non-transitory storage medium readable by the CPU 10 as a computer. The data stored in the memory 11 includes a wear flag 112. The wear flag 112 is used in a pulse rate measurement process, a wear state determination process, a notification process and a settlement process, which will be described later. The wear flag 112 is, for example, a 1-bit data of "0" or "1".

The display 12 performs digital representation (display) on its display screen under the control of the CPU 10. The display screen of the display 12 of this embodiment is capable of performing display with a dot matrix system, for example, a liquid crystal display screen. The display 12 displays, for example, basic information, such as time and date, the measurement result of the user's pulse rate, and various notifications for the user.

The operation receiver 13 includes the aforementioned operation buttons 131. The operation receiver 13 receives user input operations (e.g., press) on the operation buttons 131 and outputs these as input signals to the CPU 10. The CPU 10 performs a process corresponding to the function of each operation button 131 on which an input operation has been made. The function assigned to each operation button 131 may be changed to another in accordance with an action mode of the electronic timepiece 1. The operation buttons 131 may include a crown. The operation receiver 13 may have a touchscreen superimposed on the display screen of the display 12.

The time measurer 14 includes an oscillator circuit, a frequency divider circuit and a timer circuit. In the time measurer 14, a clock signal generated by the oscillator circuit is frequency-divided by the frequency divider circuit, and the signals generated by the dividing are counted by the timer circuit. Thus, the time measurer 14 derives and keeps the current date and time.

The pulse wave detector 15 detects the pulse wave as biometric data on the user.

The light emitter 151 of the pulse wave detector 15 includes a light emitting element that emits light, such as an LED (Light Emitting Diode). The light emitter 151 of this embodiment includes an LED that emits green light that is easily absorbed by hemoglobin in blood, for example, light with a peak wavelength of 520 nm to 530 nm. The pulse wave detector 15 further includes a light emitter driver that supplies drive current to the light emitter 151. The light emitter 151 emits light in response to the supply of the drive current from the light emitter driver. The pulse wave detector 15 controls the output of the drive current from the light emitter driver to the light emitter 151 in accordance with control signals supplied from the CPU 10, thereby causing the LED of the light emitter 151 to emit light and stop emitting light.

The light receiver 152 of the pulse wave detector 15 includes a light receiving element that detects light and outputs an electric signal corresponding to the amount of the light received (intensity of incident light). Examples of the light receiving element includes a photodiode and an illuminance sensor. The pulse wave detector 15 further includes an ADC (Analog-to-Digital Converter) that converts analog signals output from the light receiver 152 into digital signals and outputs same to the CPU 10.

The vibrator 16 vibrates under the control of the CPU 10. The vibrator 16 includes a motor, a rotary shaft that is rotated by the motor, and a weight eccentrically attached to the rotary shaft. The vibrator 16 functions as a vibration source by transmitting vibrations generated by the rotation of the eccentric weight to the surroundings. The characteristics of the vibrator 16 and the duration of vibration of the vibrator 16 can be changed appropriately depending on the intended use of the vibration. The CPU 10 controls start and stop of vibration of the vibrator 16. In other words, the CPU 10 performs vibration control to cause the vibrator 16 to (start to) vibrate and vibration stop control to cause the vibrator 16 to stop vibrating.

Vibrations of the vibrator 16 are transmitted to the case of the main body 2 of the electronic timepiece 1. The user wearing the electronic timepiece 1 can perceive the vibrations transmitted to the case on his/her wrist.

The sensor unit 17 includes sensors that are a triaxial accelerometer 171 (accelerometer), a triaxial gyro sensor 172 and a triaxial geomagnetic sensor 173. The sensor unit 17 further includes an ADC that converts analog signals output from the triaxial accelerometer 171, the triaxial gyro sensor 172 and the triaxial geomagnetic sensor 173 into digital signals and outputs same to the CPU 10.

The triaxial accelerometer 171 detects the acceleration of the electronic timepiece 1 at a predetermined sampling frequency, the acceleration occurring in response to motion of the user or vibration of the vibrator 16, and outputs a detection signal(s) thereof. The triaxial accelerometer 171 detects accelerations in directions of three axes perpendicular to one another. On the basis of the detection signals of the accelerations in the directions of the three axes input from the triaxial accelerometer 171, the CPU 10 calculates a composite acceleration (triaxial composite value) into which the accelerations in the directions of the three axes are combined. Alternatively, the sensor unit 17 may include a processor and calculate the composite acceleration therein.

The triaxial gyro sensor 172 detects the angular velocity relative to a predetermined axis of the electronic timepiece 1 at a predetermined sampling frequency, the angular velocity occurring in response to motion of the user or vibration of the vibrator 16, and outputs a detection signal(s) thereof. The triaxial gyro sensor 172 detects angular velocities relative to the three axes perpendicular to one another.

The triaxial geomagnetic sensor 173 detects the component(s) of the geomagnetic field in the directions of the three axes perpendicular to one another at a predetermined sampling frequency, and outputs detection signals thereof. On the basis of the detection signals of the components of the geomagnetic field in the directions of the three axes input from the triaxial geomagnetic sensor 173, the CPU 10 calculates an orientation of the electronic timepiece 1. Alternatively, the sensor unit 17 may include a processor and calculate the orientation of the electronic timepiece 1 therein.

Actions of Electronic Timepiece

Next, actions of the electronic timepiece 1, mainly wear state determination associated with pulse rate measurement, will be described.

The above-described pulse wave detection by the pulse wave detector 15 and pulse rate measurement based on the detection result of the pulse wave cannot be performed if the electronic timepiece 1 is not being worn on the user's body. If the electronic timepiece 1 is not being worn on the user's body, the light emitted from the light emitter 151 is not reflected by the user's wrist, so that the light receiver 152 cannot receive reflected light containing information on the pulse wave. Hence, in the electronic timepiece 1 of this embodiment, if an operation as a pulse rate measurement instruction is made by the user, it is determined whether or not the electronic timepiece 1 is being worn on the user's body (which hereinafter may be referred to as "wear state determination"). If it is determined in the wear state determination that the electronic timepiece 1 is being worn on the user's body, the pulse wave detection and the pulse rate measurement are performed. If it is determined in the wear state determination that the electronic timepiece 1 is not being worn on the user's body, namely, in a no-wear state, the pulse wave detection and the pulse rate measurement are not performed, and also the light emission by the light emitter 151 is not performed in terms of appearance and power consumption.

Hereinafter, the electronic timepiece 1 is "being worn (not being worn) on the user's body" may be simply referred to as "being worn (not being worn) by the user".

As a method for the wear state determination, there has been known a method of determining whether an electronic device is being worn on the body of a user on the basis of the intensity of reflected and received light of light emitted from a light emitter provided in the electronic device. However, this method has a problem that if there is an object that reflects light emitted from the light emitter to a light receiver, it is falsely determined that the user is wearing the electronic device although he/she is not actually wearing the electronic device.

In contrast, the electronic timepiece 1 of this embodiment performs the wear state determination with a method different from the conventional method described above. In the wear state determination of this embodiment, the CPU 10 of the electronic timepiece 1 performs the vibration control to cause the vibrator 16 to vibrate, and determines the wear state of the electronic timepiece 1 on the basis of the accelerations detected by the triaxial accelerometer 171 of the sensor unit 17 in a vibration period in which the vibrator 16 is vibrating. Hereinafter, the method for the wear state determination based on the accelerations will be described.

As described above, vibrations of the vibrator 16 are transmitted to the case of the main body 2 of the electronic timepiece 1, and the user wearing the electronic timepiece 1 can perceive the vibrations transmitted to the case on his/her wrist. Thus, if the vibrator 16 vibrates with the electronic timepiece 1 worn by the user, the vibration energy is partly transmitted to the user's wrist. Hence, the vibration energy that is used for vibrating the electronic timepiece 1 decreases by the amount transmitted to the wrist. Therefore, the intensity (amplitude) of the vibration of the electronic timepiece 1 when the vibrator 16 vibrates in the state in which the electronic timepiece 1 is being worn by the user is weaker (lower) than that when the vibrator 16 vibrates in the state in which the electronic timepiece 1 is not being worn by the user.

The acceleration of the electronic timepiece 1, the acceleration occurring in response to vibration of the electronic timepiece 1, is detected by the triaxial accelerometer 171. The CPU 10 calculates the composite acceleration into which the accelerations in the directions of the three axes are combined. Hereinafter, the simple "acceleration" refers to the composite acceleration (triaxial composite value) into which the accelerations in the directions of the three axes are combined.

Figure 3:
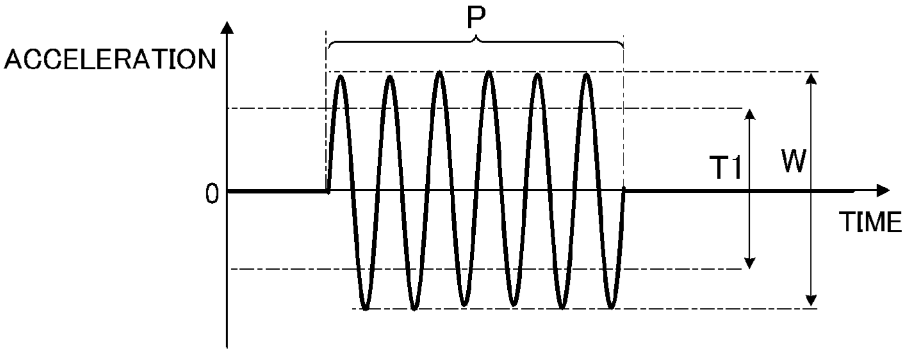
FIG. 3 schematically shows the acceleration that is detected while a vibrator, and by extension, the electronic timepiece, is vibrating with the electronic timepiece not worn by a user.

FIG. 3 schematically shows the acceleration that is detected while the vibrator 16, and by extension, the electronic timepiece 1, is vibrating with the electronic timepiece 1 not worn by the user.

Figure 4:
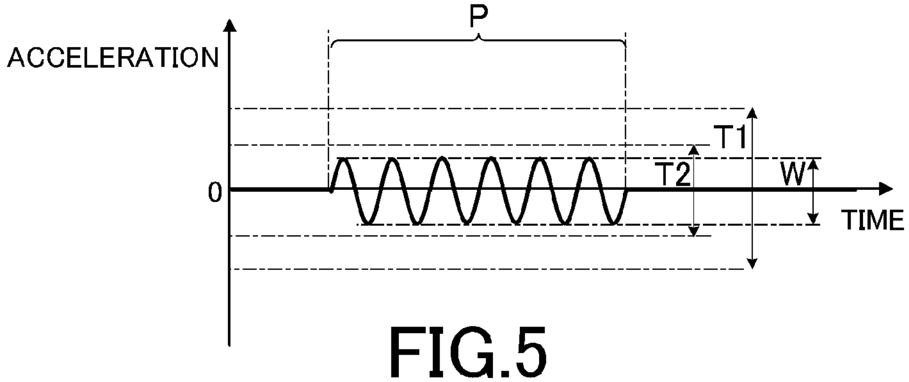
FIG. 4 schematically shows the acceleration that is detected while the vibrator, and by extension, the electronic timepiece, is vibrating with the electronic timepiece worn by the user.

FIG. 4 schematically shows the acceleration that is detected while the vibrator 16, and by extension, the electronic timepiece 1, is vibrating with the electronic timepiece 1 worn by the user.

FIG. 3 and FIG. 4 each show change with time of the composite acceleration, into which the acceleration in the directions of the three axes are combined, detected by the triaxial accelerometer 171 in a vibration period P in which the vibrator 16, and by extension, the electronic timepiece 1, is vibrating. As shown in FIG. 3 and FIG. 4, the acceleration fluctuates cyclically on a cycle that is the same as a vibration cycle of the vibrator 16, and by extension, the electronic timepiece 1. For convenience of explanation, in FIG. 3 and FIG. 4, the number of cycles that the acceleration fluctuates in the vibration period P is depicted less than in reality. The same applies to FIG. 5 and FIG. 6 described later.

The absolute values of a local maximum(s) and a local minimum(s) of the acceleration of the electronic timepiece 1 become larger as the intensity (amplitude) of the vibration of the electronic timepiece 1 increases. Hence, a fluctuation range W of the acceleration becomes larger as the intensity of the vibration of the electronic timepiece 1 increases. The acceleration fluctuating according to the intensity of the vibration of the electronic timepiece 1 includes the acceleration fluctuating with a fluctuation pattern corresponding to change in the intensity of the vibration of the electronic timepiece 1. The acceleration fluctuating with the fluctuation pattern corresponding to change in the intensity of the vibration of the electronic timepiece 1 includes the acceleration fluctuating with the fluctuation range W corresponding to the intensity of the vibration of the electronic timepiece 1.

As described above, the intensity of the vibration of the electronic timepiece 1, which corresponds to the vibration of the vibrator 16, in the state in which the electronic timepiece 1 is being worn by the user is weaker than that in the state in which the electronic timepiece 1 is not being worn by the user. Hence, the fluctuation range W of the acceleration that is detected in the state in which the electronic timepiece 1 is being worn by the user (FIG. 4) is smaller than that in the state in which the electronic timepiece 1 is not being worn by the user (FIG. 3).

The length of the vibration period P is a length with which the fluctuation range W of the acceleration can be identified, and, in principal, is equal to or longer than one fluctuation cycle of the acceleration. The length of the vibration period P may be long enough to obtain a highly reliable representative value (e.g., average) of the fluctuation range W on the basis of the acceleration over a plurality of fluctuation cycles. The length of the vibration period P may be set to a length with which the user is not annoyed with the vibration.

The CPU 10 determines whether or not the electronic timepiece 1 is being worn on the user's body on the basis of a magnitude relationship between a determination value corresponding to the fluctuation range W of the acceleration detected and a predetermined first threshold value T1. In this embodiment, the fluctuation range W itself is used as the determination value. The determination value is not limited to the fluctuation range W of the acceleration, but may be any value as far as it corresponds to the magnitude of a physical quantity that fluctuates according to the intensity of the vibration of the electronic timepiece 1. Examples of the determination value include the amplitude of the acceleration (half of the fluctuation range W), the absolute value of the local maximum(s) of the acceleration, and the absolute value of the local minimum(s) of the acceleration. The fluctuation range W, the amplitude and the absolute values of the local maximum(s) and the local minimum(s) of the acceleration are examples of the "physical quantity that becomes larger as the intensity of the vibration of the electronic device increases".

The first threshold value T1 is preset and stored in the memory 11. The preset first threshold value T1 is a value less than the fluctuation range W of the acceleration that is detected in the state in which the electronic timepiece 1 is not being worn by the user and more than the fluctuation range W of the acceleration that is detected in the state in which the electronic timepiece 1 is being worn by the user.

Hence, the CPU 10 determines that the electronic timepiece 1 is not being worn by the user if the fluctuation range W as the determination value is equal to or more than the first threshold value T1, and determines that the electronic timepiece 1 is being worn by the user if the fluctuation range W is less than the first threshold value T1. In the example shown in FIG. 3, the CPU 10 determines that the electronic timepiece 1 is not being worn by the user because the fluctuation range W is equal to or more than the first threshold value T1. In the example shown in FIG. 4, the CPU 10 determines that the electronic timepiece 1 is being worn by the user because the fluctuation range W is less than the first threshold value T1.

As shown in FIG. 1, the vibrator 16 may be disposed near, of the main body 2, a back cover 2*a* that contacts the user's wrist (i.e., disposed at the back cover 2*a* side over the center of the main body 2 in the thickness direction that is perpendicular to the surface of the back cover 2*a*). The vibrator 16 may be disposed at a point where the vibrator 16 directly contacts the inner wall of the back cover 2*a* or at a point where the vibrator 16 contacts the back cover 2*a* with another member in between. If the vibrator 16 is disposed at one of the aforementioned points, the vibration energy of the vibration of the vibrator 16 in the state in which the electronic timepiece 1 is being worn by the user is more likely to be transmitted to the user's wrist. Hence, the intensity of the vibration and the fluctuation range W of the acceleration of the electronic timepiece 1 in the state in which the electronic timepiece 1 is being worn by the user are greatly weaker and smaller than those in the state in which the electronic timepiece 1 is not being worn by the user. This enables more accurate wear state determination based on the fluctuation range W of the acceleration.

If the electronic timepiece 1 is being worn loosely on the user's wrist, namely, in a loose wear state, the accuracy of the pulse wave detection and the accuracy of the pulse rate measurement decrease. Hence, if it is determined that the electronic timepiece is being worn on the user's wrist in the loose wear state, it is preferable to notify the user of that to urge him/her to wear the electronic timepiece 1 normally/properly (i.e., to tighten the belt 3), namely, in a normal wear state. In view of this, the electronic timepiece 1 of this embodiment is capable of determining whether or not the electronic timepiece 1 is being worn loosely on the user's wrist, namely, whether or not the wear state of the electronic timepiece 1 is the loose wear state.

Figure 5:
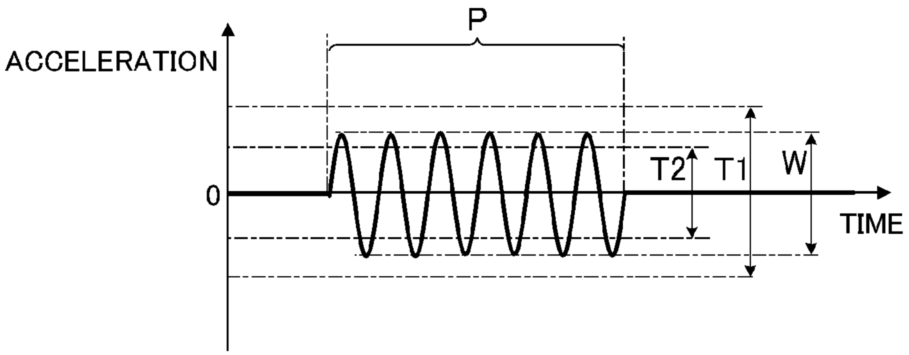
FIG. 5 schematically shows the acceleration that is detected while the vibrator, and by extension, the electronic timepiece, is vibrating with the electronic timepiece worn loosely on the user's wrist.

FIG. 5 schematically shows the acceleration that is detected while the vibrator 16, and by extension, the electronic timepiece 1, is vibrating with the electronic timepiece 1 worn loosely on the user's wrist.

The intensity of the vibration of the electronic timepiece 1 being worn on the user's wrist in the state looser than the normal wear state is higher than that of the electronic timepiece 1 being worn on the user's wrist in the normal wear state. This is because if the electronic timepiece 1 is being worn loosely on the user's wrist, the vibration energy generated by the vibration of the vibrator 16 is less likely to be transmitted to the wrist, so that the vibration energy that is used for vibrating the electronic timepiece 1 increases. Hence, the fluctuation range W of the acceleration that is detected in the state in which the electronic timepiece 1 is being worn loosely on the user's wrist (FIG. 5) is larger than that in the state in which the electronic timepiece 1 is being worn normally on the user's wrist (FIG. 4).

The electronic timepiece 1 of this embodiment uses a second threshold value T2 that is smaller than the first threshold value T1 to determine whether or not the wear state of the electronic timepiece 1 is the loose wear state. More specifically, if the fluctuation range W as the determination value is less than the first threshold value T1 and equal to or more than the second threshold value T2, which is smaller than the first threshold value T1, the CPU 10 determines that the electronic timepiece 1 is neither in the normal wear state nor in the no-wear state, in which the electronic timepiece 1 is not being worn on the user's body, but is being worn loosely on the user's body, namely, in the state looser than the normal wear state. In the example shown in FIG. 5, the CPU 10 determines that the electronic timepiece 1 is being worn by the user in the loose wear state because the fluctuation range W is less than the first threshold value T1 and equal to or more than the second threshold value T2. In the example shown in FIG. 4, the CPU 10 determines that the electronic timepiece 1 is being worn by the user in the normal wear state because the fluctuation range W is less than the second threshold value T2.

In the above, it is determined whether the wear state is the loose wear state or not (two levels) using the second threshold value T2. However, the degree of the looseness of the wear state (degree of the tightness of the belt 3) may be determined (three or more levels) using two or more second threshold values T2 different from one another. On the contrary, it may be determined whether the electronic timepiece 1 is in the normal wear state (one level) using the second threshold value T2 only, namely, not using the first threshold value T1.

If the CPU 10 determines in the wear state determination that the electronic timepiece 1 is not being worn by the user, the CPU 10 may reduce the vibration intensity of the vibrator 16 that is used for the wear state determination until next time the CPU 10 determines that the electronic timepiece 1 is being worn by the user. In other words, if the fluctuation range W as the determination value in a certain vibration period P is equal to or more than the first threshold value T1, the CPU 10 determines that the electronic timepiece 1 is not being worn by the user, and may reduce the vibration intensity of the vibrator 16 for the next vibration control, namely, for the next vibration period P. In order to perform such control, the determination result of the most recent wear state determination is reflected in the wear flag 112 stored in the memory 11. For example, the wear flag 112 is set to "ON (1)" if it is determined in the most recent wear state determination that the electronic timepiece 1 is being worn by the user, and is set to "OFF (0)" if it is determined in the most recent wear state determination that the electronic timepiece 1 is not being worn by the user. If the wear flag 112 is "ON" when the next wear state determination is started, the vibration intensity of the vibrator 16 is set to a normal intensity, and if the wear flag 112 is "OFF" when the next wear state determination is started, the vibration intensity of the vibrator 16 is set to an intensity weaker than the normal intensity.

Thus, weakening the vibration for when the electronic timepiece 1 is not being worn by the user can reduce power consumption and accordingly reduce action noise that is made by the vibration.

In the wear state determination that the CPU 10 performs after reducing and before returning the vibration intensity of the vibrator 16 for the wear state determination to the normal intensity, namely, in a period from when the CPU 10 reduces the vibration intensity of the vibrator 16 until next time the CPU 10 determines that the electronic timepiece 1 is being worn by the user, the CPU 10 determines the wear state on the basis of a first threshold value Ta1 and a second threshold value Ta2 to which the first threshold value T1 and the second threshold value T2 have been corrected, respectively, according to the degree of the reduction of the vibration intensity of the vibrator 16. The post-correction first threshold value Ta1 and the post-correction second threshold value Ta2 are smaller than the pre-correction first threshold value T1 and the pre-correction second threshold value T2, respectively. The post-correction first threshold value Ta1 and the post-correction second threshold value Ta2 may be preset and stored in the memory 11.

Figure 6:
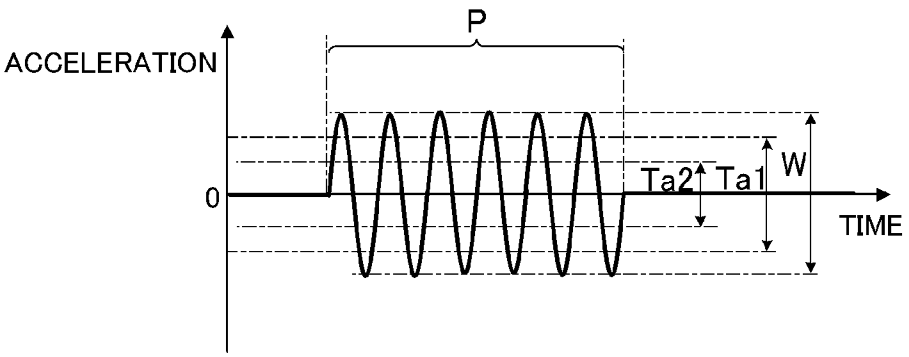
FIG. 6 shows wear state determination using a post-correction first threshold value and a post-correction second threshold value.

FIG. 6 shows the wear state determination using the post-correction first threshold value Ta1 and the post-correction second threshold value Ta2.

FIG. 6 schematically shows the acceleration that is detected in the vibration period P in the state in which the vibration intensity of the vibrator 16 has been reduced and the electronic timepiece 1 is not being worn by the user. Due to the reduced vibration intensity of the vibrator 16, the fluctuation range W of the acceleration shown in FIG. 6 is smaller than that shown in FIG. 3, which shows the acceleration that is detected while the vibrator 16 is vibrating with the normal vibration intensity. Use of the first threshold value Ta1 and the second threshold value Ta2, which are smaller than the first threshold value T1 and the second threshold value T2, respectively, in this case enables appropriate wear state determination with decrease in the acceleration corresponding to the reduction of the vibration intensity taken into account. In the example shown in FIG. 6, the CPU 10 determines that the electronic timepiece 1 is not being worn by the user because the fluctuation range W is equal to or more than the first threshold value Ta1.

If the fluctuation range W of the acceleration detected is less than the first threshold value Ta1 in the state in which the vibration intensity of the vibrator 16 has been reduced, the CPU 10 determines that the electronic timepiece 1 is being worn by the user, and uses the first threshold value T1 and the second threshold value T2 in the next wear state determination.

<Pulse Rate Measurement Process and Wear State Determination Process>

Next, the pulse rate measurement process and the wear state determination process will be described. The wear state determination process is for determining the wear state, namely, for performing the wear state determination described above, and the pulse rate measurement process is for measuring the pulse rate in accordance with the result of the wear state determination.

Figure 7:
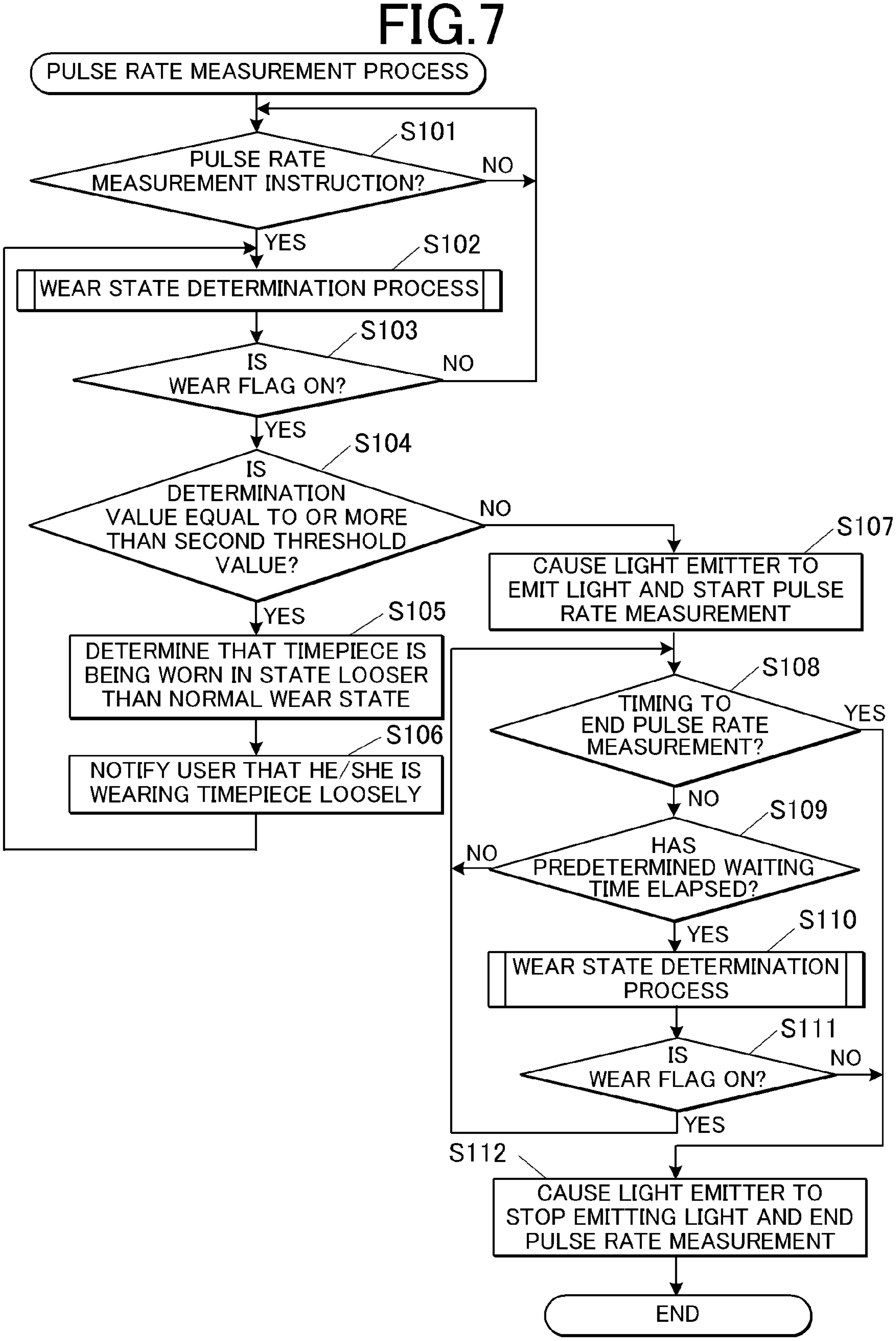
FIG. 7 is a flowchart showing a control procedure of a pulse rate measurement process.

FIG. 7 is a flowchart showing a control procedure of the pulse rate measurement process.

The pulse rate measurement process is performed when the electronic timepiece 1 is powered and starts up.

When the pulse rate measurement process is started, the CPU 10 determines whether an instruction to measure the pulse rate has been made by the user (Step S101). In Step S101, the CPU 10 determines that an instruction to measure the pulse rate has been made if an operation of pressing an operation button 131 to which the function of pulse rate measurement is assigned has been made. If the CPU 10 determines that no instruction to measure the pulse rate has been made (Step S101: NO), the CPU 10 repeats Step S101. If the CPU 10 determines that an instruction to measure the pulse rate has been made (Step S101: YES), the CPU 10 performs the wear state determination process (Step S102).

Figure 8:
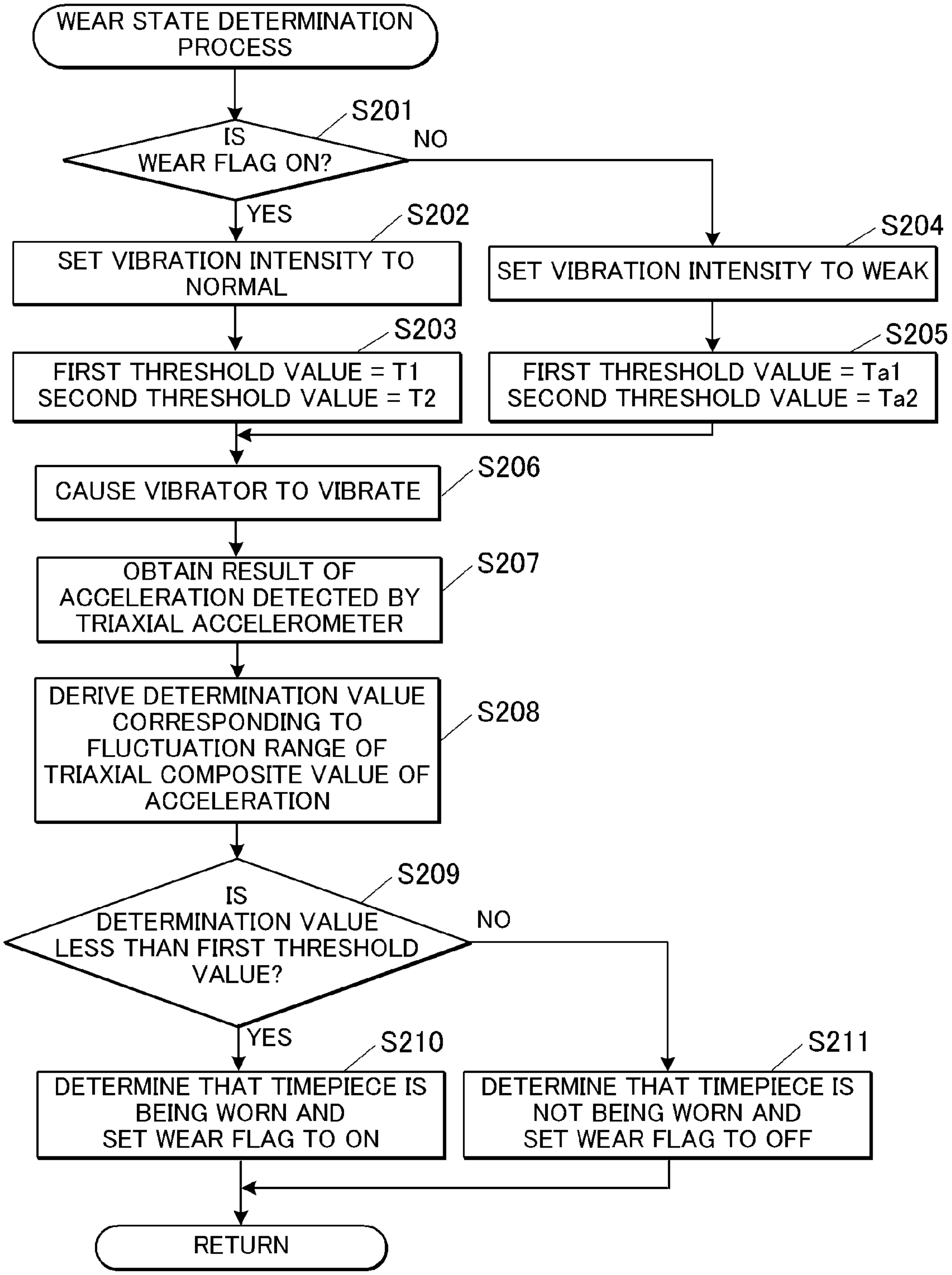
FIG. 8 is a flowchart showing a control procedure of a wear state determination process.

FIG. 8 is a flowchart showing a control procedure of the wear state determination process.

When the wear state determination process is called, the CPU 10 determines whether the wear flag 112 is "ON" (Step S201). At the startup of the electronic timepiece 1, the wear flag 112 may be either "ON" or "OFF", but it is preferable that the wear flag 112 be "OFF" if the user wishes to reduce action noise that is made by the first vibration while the user is not wearing the electronic timepiece 1.

If the CPU 10 determines that the wear flag 112 is "ON" (Step S201: YES), the CPU 10 sets the vibration intensity of the vibrator 16 to the normal intensity (Step S202), and sets the first threshold value and the second threshold value to T1 and T2, respectively (Step S203).

If the CPU 10 determines that the wear flag 112 is "OFF" (Step S201: NO), the CPU 10 sets the vibration intensity of the vibrator 16 to the intensity weaker than the normal intensity (Step S204), and sets the first threshold value and the second threshold value to Ta1 and Ta2, respectively (Step S205).

After Step S203 or Step S205, the CPU 10 performs the vibration control to cause the vibrator 16 to vibrate (Step S206). The CPU 10 obtains results of the accelerations in the directions of the three axes detected by the triaxial accelerometer 171 (Step S207). The CPU 10 derives a determination value corresponding to the fluctuation range W of the triaxial composite value of the obtained accelerations (Step S208). As described above, in this embodiment, the fluctuation range W itself is used as the determination value. Although not shown in FIG. 8, the CPU 10 performs the vibration stop control to cause the vibrator 16 to stop vibrating when a predetermined vibration period P elapses from the start of the vibration of the vibrator 16.

The CPU 10 determines whether the fluctuation range W as the determination value is less than the first threshold value (T1 or Ta1) (Step S209). If the CPU 10 determines that the fluctuation range W is less than the first threshold value (T1 or Ta1) (Step S209: YES), the CPU 10 determines that the electronic timepiece 1 is being worn by the user and sets the wear flag 112 to "ON" (Step S210). If the CPU 10 determines that the fluctuation range W is equal to or more than the first threshold value (T1 or Ta1) (Step S209: NO), the CPU 10 determines that the electronic timepiece 1 is not being worn by the user and sets the wear flag 112 to "OFF" (Step S211).

After Step S210 or Step S211, the CPU 10 ends the wear state determination process and returns to the pulse rate measurement process shown in FIG. 7.

Although FIG. 8 shows that the vibration intensity is adjusted in accordance with the determination result (content of the wear flag 112) in the last wear state determination process, if such vibration intensity adjustment is unnecessary, Steps S201 to S205 may be omitted.

When the wear state determination process in Step S102 of FIG. 7 finishes, the CPU 10 determines whether the wear flag 112 is "ON" (i.e., whether the electronic timepiece 1 is being worn by the user according to the wear state determination process in Step S102) (Step S103). If the CPU 10 determines that the wear flag 112 is "OFF" (i.e., the electronic timepiece 1 is not being worn by the user according to the wear state determination process in Step S102) (Step S103: NO), the CPU 10 returns to Step S101 without causing the light emitter 151 to emit light and measuring the pulse rate.

If the CPU 10 determines that the wear flag 112 is "ON" (i.e., the electronic timepiece 1 is being worn by the user according to the wear state determination process in Step S102) (Step S103: YES), the CPU 10 determines whether the fluctuation range W as the determination value derived in Step S208 of the wear state determination process is equal to or more than the second threshold value (T2 or Ta2) (Step S104). If the CPU 10 determines that the fluctuation range W is equal to or more than the second threshold value (T2 or Ta2) (Step S104: YES), the CPU 10 determines that the electronic timepiece 1 is being worn in the state looser than the normal wear state (Step S105), and notifies the user that he/she is wearing the electronic timepiece 1 loosely (i.e., in the loose wear state) (Step S106). This notification may be performed, for example, by the display 12 displaying a predetermined message, a not-shown sound outputter outputting sound, and/or a not-shown light emitter for notification emitting light. The display 12, the sound outputter and the light emitter for notification are examples of the notifier.

After Step S106, the CPU 10 returns to Step S102 to repeatedly perform the loop process of Steps S102 to S106. If the user re-wears the electronic timepiece 1 to be in the normal wear state, Step S104 is "NO", and the CPU 10 proceeds to Step S107.

In the case where the degree of the looseness of the wear state is not determined, namely, in the case where only whether the electronic timepiece 1 is being worn by the user is determined, Steps S104 to S106 may be omitted, and if Step S103 is "YES", the CPU 10 proceeds to Step S107.

Although FIG. 7 shows that the loop process of Steps S102 to S106 is repeatedly performed until the wear state becomes the normal wear state, if notifying the user of the loose wear state one time is enough, the loop process of Steps S102 to S106 may be performed one time only. In this case, after Step S106, the CPU 10 proceeds to Step S107 to start to measure the pulse rate.

In Step S104, if the CPU 10 determines that the fluctuation range W is less than the second threshold value (T2 or Ta2) (S104: NO), the CPU 10 determines that the electronic timepiece 1 is being worn by the user in the normal wear state, and causes the light emitter 151 to emit light and the pulse wave detector 15 to start to detect the pulse wave, and accordingly starts the pulse rate measurement based on the detection result (Step S107).

The CPU 10 determines whether it is a timing to end the pulse rate measurement (Step S108). If the CPU 10 determines that it is the timing to end the pulse rate measurement (Step S108: YES), the CPU 10 proceeds to Step S112 to cause the light emitter 151 to stop emitting light and the pulse wave detector 15 to stop detecting the pulse wave, and accordingly ends the pulse rate measurement (Step S112). If the CPU 10 determines that it is not the timing to end the pulse rate measurement (Step S108: NO), the CPU 10 determines whether a predetermined waiting time before re-determining the wear state has elapsed (Step S109). If the CPU 10 determines that the predetermined waiting time has not elapsed yet (Step S109: NO), the CPU 10 returns to Step S108. If the CPU 10 determines that the predetermined waiting time has elapsed (Step S109: YES), the CPU 10 performs the wear state determination process shown in FIG. 8 again (Step S110).

The CPU 10 determines whether the wear flag 112 is "ON" (i.e., whether the electronic timepiece 1 is being worn by the user according to the wear state determination process in Step S110) (Step S111). If the CPU 10 determines that the wear flag 112 is "ON" (i.e., the electronic timepiece 1 is being worn by the user according to the wear state determination process in Step S110) (Step S111: YES), the CPU 10 continues the pulse rate measurement and returns to Step S108.

If the CPU 10 determines in Step S111 that the wear flag 112 is "OFF" (i.e., the electronic timepiece 1 is not being worn by the user according to the wear state determination process in Step S110) (Step S111: NO), the CPU 10 causes the light emitter 151 to stop emitting light and the pulse wave detector 15 to stop detecting the pulse wave, and accordingly ends the pulse rate measurement (Step S112) because it is a situation where the pulse wave detector 15 cannot detect the pulse wave. The process of Step S111 being "NO" and Step S112 corresponds to "the processor determines that the electronic device is not being worn on the body of the user and causes the biometric data measurer not to act in response to the determination value in the vibration period being equal to or more than the first threshold value".

After Step S112, the CPU 10 ends the pulse rate measurement process.

<Wear State Determination Incorporated in Other Actions>

In the above, the wear state determination incorporated in the pulse rate measurement is described, but the wear state determination may be incorporated in other actions of the electronic timepiece 1. Hereinafter, the wear state determination incorporated in notification and the wear state determination incorporated in account settlement will be described.

<Wear State Determination Incorporated in Notification>

When, for example, a notification event occurs in a not-shown application program(s) installed in the memory 11, or it is an alarm time in an alarm function, the electronic timepiece 1 notifies the user of that. The notification to the user is performed by the display 12 displaying a message and the vibrator 16 vibrating, optionally in combination with the sound outputter outputting sound, the light emitter for notification emitting light, and/or the like.

When a notification event occurs, the vibration of the vibrator 16 that is performed for notification thereof can be utilized for the wear state determination. In other words, in a vibration period P in which the vibrator 16 is vibrating for notification, the electronic timepiece 1 can detect the acceleration of itself and perform the wear state determination based on the magnitude relationship between the fluctuation range W of the acceleration and each of the first threshold value T1 and the second threshold value T2. Thus, the electronic timepiece 1 can reduce the number of times that the vibrator 16 vibrates for the sole purpose of the wear state determination or cause the vibrator 16 not to vibrate for that purpose only. The electronic timepiece 1, accordingly, can reduce annoyance that the user may feel.

If the CPU 10 determines in the above wear state determination that the electronic timepiece 1 is not being worn by the user, the CPU 10 may cause the notifier not to perform (e.g., to stop) a notifying action that excludes the vibration by the vibrator 16. Examples of the notifying action include display by the display 12. Further, the CPU 10 may make the vibration intensity of the vibrator 16 for the next notification or alarming and/or the vibration intensity of the vibrator 16 for the next wear state determination weaker. Not performing the notifying action that is unnecessary and making the vibration smaller can reduce power consumption.

The wear state determination in sync with the notification may be combined with the wear state determination incorporated in the pulse rate measurement. For example, if a notification event occurs after Step S107 in FIG. 7, in which the CPU 10 starts the pulse rate measurement, the CPU 10 may perform the wear state determination using the vibration of the vibrator 16 performed for the notification event, and if the CPU 10 determines in the wear state determination that the electronic timepiece 1 is not being worn by the user, the CPU 10 proceeds to Step S112 to end the pulse rate measurement.

Figure 9:
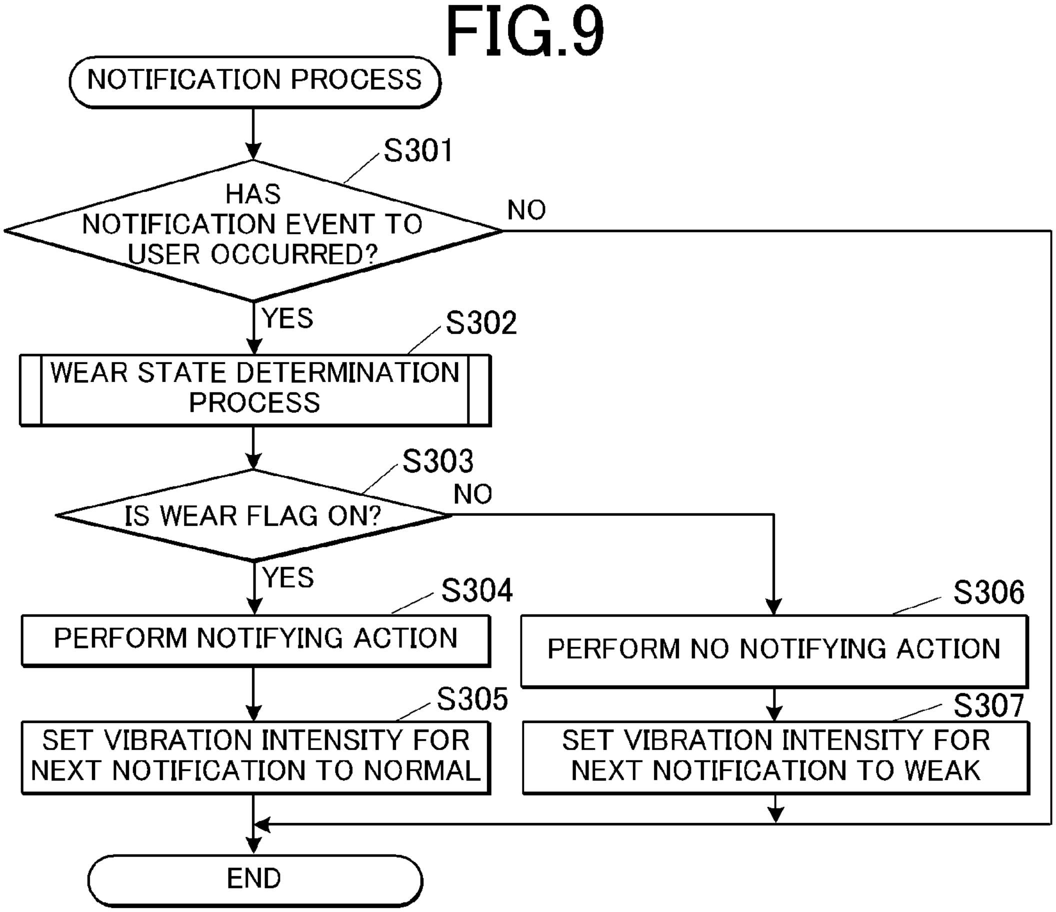
FIG. 9 is a flowchart showing a control procedure of a notification process that is for performing notification to the user.

FIG. 9 is a flowchart showing a control procedure of the notification process that is for performing the notification.

When the notification process is started, the CPU 10 determines whether a notification event to the user has occurred (Step S301). If the CPU 10 determines that a notification event has occurred (Step S301: YES), the CPU 10 performs the wear state determination process shown in FIG. 8 (Step S302). The vibration performed by the vibrator 16 in Step S206 of the wear state determination process constitutes part of the notification to the user performed in response to the occurrence of the notification event. In other words, if the notification to the user is performed using the vibration by the vibrator 16, this vibration is utilized for the wear state determination. In this embodiment, the notification to the user is performed by the vibration by the vibrator 16 and the notifying action, which excludes vibration, such as display by the display 12. Whether to perform the notifying action, which excludes vibration, is determined in Step S303.

The CPU 10 determines whether the wear flag 112 is "ON" (i.e., whether the electronic timepiece 1 is being worn by the user according to the wear state determination process in Step S302) (Step S303). If the CPU 10 determines that the wear flag 112 is "ON" (i.e., the electronic timepiece 1 is being worn by the user according to the wear state determination process in Step S302) (Step S303: YES), the CPU 10 causes the notifying action (notifying action excluding vibration), such as display by the display 12, to be performed (Step S304), and sets the vibration intensity of the vibrator 16 for the next notification to the normal intensity (Step S305). For example, if the vibration intensity of the vibrator 16 has been set to the weak intensity, the CPU 10 changes the setting such that the vibration intensity of the vibrator 16 at the next notification is the normal intensity (Step S305).

If the CPU 10 determines that the wear flag 112 is "OFF" (i.e., the electronic timepiece 1 is not being worn by the user according to the wear state determination process in Step S302) (Step S303: NO), the CPU 10 causes the notifying action, which excludes the vibration performed by the vibrator 16 in Step S302 (i.e., Step S206 in FIG. 8), not to be performed (Step S306), and sets the vibration intensity of the vibrator 16 for the next notification to the intensity weaker than the normal intensity (Step S307). For example, if the vibration intensity of the vibrator 16 has been set to the normal intensity, the CPU 10 reduces the vibration intensity of the vibrator 16 to change the setting such that the vibration intensity thereof at the next notification is the intensity weaker than the normal intensity (Step S307). The process of Step S303 being "NO" and Step S306 corresponds to "the processor determines that the electronic device is not being worn on the body of the user and causes the notifier not to act in response to the determination value in the vibration period being equal to or more than the first threshold value".

After Step S305, Step S307, or Step S301 being "NO", namely, the CPU 10 determines in Step S301 that no notification event has occurred, the CPU 10 ends the notification process.

Although FIG. 9 shows that the CPU 10 sets the vibration intensity for the next notification to the weak intensity in response to determining that the electronic timepiece 1 is not being worn by the user, if such vibration intensity adjustment is unnecessary, Steps S305 and S307 may be omitted.

Further, the following is performable: if a notification event has occurred (Step S301: YES), the CPU 10 causes the notifying action, which excludes vibration, to be performed together with the vibration by the vibrator 16 in Step S206 of the wear state determination process, and if the CPU 10 determines that the wear flag is "OFF" (Step S303: NO), the CPU 10 changes the setting such that the notifying action, which excludes vibration, is not performed next time a notification event occurs.

<Wear State Determination Incorporated in Settlement>

If the electronic timepiece 1 is provided with a settlement function that settles accounts, the wear state determination may be incorporated therein for security enhancement.

For example, the following is performable: in the electronic timepiece 1 set to execute the settlement function if and only if the electronic timepiece 1 is being worn by the user, when the settlement function is called (e.g., a password is entered for settlement), the CPU 10 performs the wear state determination, and if the CPU 10 determines that the electronic timepiece 1 is being worn by the user, the CPU 10 executes the settlement function, whereas if the CPU 10 determines that the electronic timepiece 1 is not being worn by the user, the CPU 10 does not execute the settlement function.

The wear state determination may be used instead of password entry. For example, the following is performable: if a predetermined operation to call the settlement function (e.g., an operation of pressing a predetermined operation button 131, an operation of tilting the electronic timepiece 1, etc.) is made, the CPU 10 performs the wear state determination, and if the CPU 10 determines that the electronic timepiece 1 is being worn by the user, the CPU 10 executes the settlement function without requesting password entry, whereas if the CPU 10 determines that the electronic timepiece 1 is not being worn by the user, the CPU 10 requests password entry and executes the settlement function after a password is entered.

Figure 10:
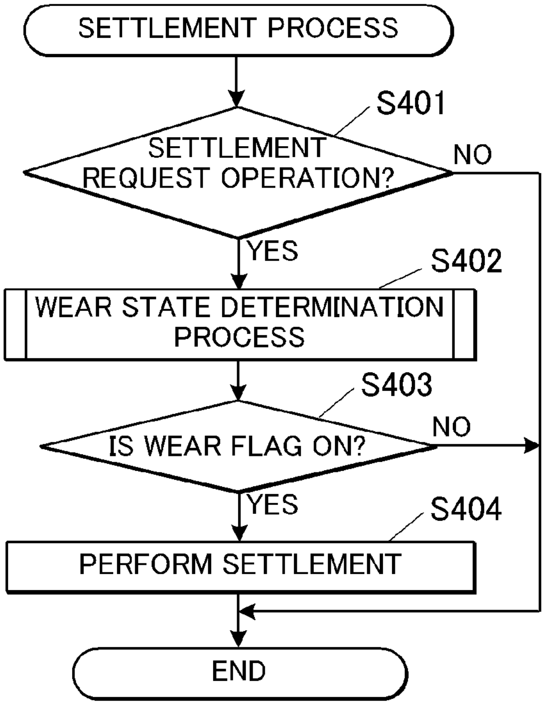
FIG. 10 is a flowchart showing a control procedure of a settlement process that is for executing a settlement function.

FIG. 10 is a flowchart showing a control procedure of the settlement process that is for executing the settlement function.

When the settlement process is started, the CPU 10 determines whether a user operation requesting execution of the settlement function has been made (Step S401). If the CPU 10 determines that a user operation requesting execution of the settlement function has been made (Step S401: YES), the CPU 10 performs the wear state determination process shown in FIG. 8 (Step S402).

The CPU 10 determines whether the wear flag 112 is "ON" (i.e., whether the electronic timepiece 1 is being worn by the user according to the wear state determination process in Step S402) (Step S403). If the CPU 10 determines that the wear flag 112 is "ON" (i.e., the electronic timepiece 1 is being worn by the user according to the wear state determination process in Step S402) (Step S403: YES), the CPU 10 executes the settlement function (Step S404). For example, the CPU 10 causes a not-shown short-range wireless communicator to transmit settlement information (credit card information, etc.) stored in the memory 11 in advance to a settlement terminal of a store. After Step S404, the CPU 10 ends the settlement process.

If the CPU 10 determines that the wear flag 112 is "OFF" (i.e., the electronic timepiece 1 is not being worn by the user according to the wear state determination process in Step S402) (Step S403: NO), the CPU 10 ends the settlement process without executing the settlement function.

If the CPU 10 determines in Step S401 that no user operation requesting execution of the settlement function has been made (Step S401), the CPU 10 ends the settlement process.

Advantageous Effects

The electronic timepiece 1 described in the above embodiment as the electronic device of the present disclosure is used by being worn on the body of a user, and includes the vibrator 16 that vibrates the electronic timepiece 1, a sensor(s) included in the sensor unit 17 that detects a physical quantity that fluctuates according to the intensity of the vibration of the electronic timepiece 1, and the CPU 10 that determines the wear state of the electronic timepiece 1 on the body of the user based on the detected physical quantity.

Thus, the electronic timepiece 1 can perform the wear state determination using the vibrator 16 and the sensor unit 17 (triaxial accelerometer 171), which the electronic timepiece 1 is standardly equipped with. This can realize the wear state determination function while avoiding complication of the configuration of the electronic timepiece 1 and increase in costs.

A conventional technique of detecting reflected light on the body of a user to determine the wear state has a problem that false detection occurs if there is an object that reflects light toward a light receiver. In contrast, according to the configuration described in the above embodiment, more appropriate wear state determination can be performed with little influence from the external environment.

A conventional technique of detecting contact of user's skin with a capacitance device provided at a point where the capacitance device contacts the user's skin to determine the wear state has a problem that an electronic device is complicated in configuration by including a sensing pad and a dedicated controller, and also has a problem that this technique is inapplicable to an electronic device having a contact part with the user's skin made of metal. In contrast, according to the configuration described in the above embodiment, it can realize the wear state determination function regardless of the material of the contact part with the skin while avoiding complication of the configuration of the electronic timepiece 1 and increase in costs.

Further, the sensor(s) of the sensor unit 17 detects the physical quantity (in the above embodiment, the fluctuation range W of the acceleration of the electronic timepiece 1) that becomes larger as the intensity of the vibration of the electronic timepiece 1 increases, and the CPU 10 causes the vibrator 16 to vibrate and determines the wear state based on a determination value (in the above embodiment, the fluctuation range W) corresponding to the magnitude of the physical quantity detected by the sensor in a vibration period P in which the vibrator 16 is vibrating. Thus, the electronic timepiece 1 can perform the wear state determination by a simple process of detecting the physical quantity (e.g., the fluctuation range W of the acceleration).

Further, the sensor(s) of the sensor unit 17 includes the triaxial accelerometer 171 that detects the acceleration of the electronic timepiece 1, and the physical quantity is the fluctuation range W of the acceleration, the amplitude of the acceleration, or the absolute value of at least one of a local maximum(s) and a local minimum(s) of the acceleration. Thus, the electronic timepiece 1 can perform the wear state determination using the triaxial accelerometer 171, which the electronic timepiece 1 is standardly equipped with.

Further, the CPU 10 determines that the electronic timepiece 1 is being worn on the body of the user in response to the determination value (in the above embodiment, the fluctuation range W) being less than a first threshold value (T1), and determines that the electronic timepiece 1 is not being worn on the body of the user in response to the determination value being equal to or more than the first threshold value (T1). Thus, the electronic timepiece 1 can perform the wear state determination by a simple process of comparing the determination value (e.g., the fluctuation range W of the acceleration) with the first threshold value (T1).

Further, the CPU 10 determines that the electronic timepiece 1 is in the normal wear state in which the electronic timepiece 1 is being worn normally on the body of the user in response to the determination value being less than a second threshold value (T2). Thus, the electronic timepiece 1 can determine whether the electronic timepiece 1 is being worn in the normal wear state by a simple process of comparing the determination value (e.g., the fluctuation range W of the acceleration) with the second threshold value (T2).

Further, in response to the determination value being less than the first threshold value (T1) and equal to or more than the second threshold value (T2) that is smaller than the first threshold value (T1), the CPU 10 determines that the electronic timepiece 1 is neither in the normal wear state, in which the electronic timepiece 1 is being worn normally on the body of the user, nor in the no-wear state, in which the electronic timepiece 1 is not being worn on the body of the user. Thus, in addition to determining whether or not the electronic timepiece 1 is being worn on the body of the user, the electronic timepiece 1 can determine whether or not the electronic timepiece 1 is being worn loosely on the body of the user. The electronic timepiece 1, accordingly, can determine the wear state in more detail.

Further, the electronic timepiece 1 further includes the notifier that performs notification to the user, such as the display 12, and the CPU 10 determines that the electronic timepiece 1 is not being worn on the body of the user and causes the notifier not to act in response to the determination value in the vibration period P being equal to or more than the first threshold value (T1). Thus, the electronic timepiece 1 can stop an unnecessary action(s) of the notifier, such as the display 12, and reduce its power consumption.

Further, the electronic timepiece 1 further includes the pulse wave detector 15 that measures biometric data on the user, and the CPU 10 determines that the electronic timepiece 1 is not being worn on the body of the user and causes the pulse wave detector 15 not to act in response to the determination value in the vibration period P being equal to or more than the first threshold value (T1). Thus, the electronic timepiece 1 can stop an unnecessary action(s) of the pulse wave detector 15 and reduce its power consumption.

Further, the CPU 10 performs the vibration control to cause the vibrator 16 to vibrate and the vibration stop control to cause the vibrator to stop vibrating, and in response to the determination value in a certain vibration period P being equal to or more than the first threshold value (T1), determines that the electronic timepiece 1 is not being worn on the body of the user and reduces the intensity of the vibration of the vibrator 16 for the next vibration control (i.e., for the next vibration period P). Thus, the electronic timepiece 1 can weaken the vibration for when the electronic timepiece 1 is not being worn by the user and can reduce its power consumption accordingly. The electronic timepiece 1 can also reduce action noise that is made by the vibration of the vibrator 16 while the electronic timepiece 1 is not being worn by the user.

Further, in determining the wear state that the CPU 10 performs after reducing the intensity of the vibration of the vibrator 16, the CPU 10 determines whether the electronic timepiece 1 is being worn on the body of the user based on the first threshold value (Ta1) that has been corrected according to the degree of the reduction of the intensity of the vibration of the vibrator 16. Thus, even after reducing the vibration intensity of the vibrator 16, the electronic timepiece 1 can appropriately perform the wear state determination on the basis of the determination value (e.g., the fluctuation range W of the acceleration).

Further, in response to the determination value in a certain vibration period P being equal to or more than the first threshold value (T1), the CPU 10 determines that the electronic timepiece 1 is not being worn on the body of the user and reduces the intensity of the vibration of the vibrator 16 for notification to the user. Thus, the electronic timepiece 1 can weaken the vibration for notification for when the electronic timepiece 1 is not being worn by the user and can reduce its power consumption accordingly. The electronic timepiece 1 can also reduce action noise that is made by the vibration of the vibrator 16 while the electronic timepiece 1 is not being worn by the user.

Further, the CPU 10 causes the vibrator 16 to vibrate to perform notification to the user, and determines the wear state based on the physical quantity (in the above embodiment, the fluctuation range W of the acceleration) detected by the sensor of the sensor unit 17 in response to the vibration of the vibrator 16 for the notification. Thus, the electronic timepiece 1 can reduce the number of times that the vibrator 16 vibrates for the sole purpose of the wear state determination or cause the vibrator 16 not to vibrate for that purpose only. The electronic timepiece 1, accordingly, can reduce annoyance that the user may feel.

Further, the control method for the electronic timepiece 1 described in the above embodiment as the control method for an electronic device of the present disclosure includes detecting a physical quantity that fluctuates according to the intensity of vibration of the electronic timepiece 1, and determining the wear state of the electronic timepiece 1 on the body of a user based on the detected physical quantity. Thus, the control method enables the electronic timepiece 1 to perform the wear state determination using the vibrator 16 and the sensor unit 17 (triaxial accelerometer 171), which the electronic timepiece 1 is standardly equipped with. This can realize the wear state determination function while avoiding complication of the configuration of the electronic timepiece 1 and increase in costs.

Further, the memory 11 described in the above embodiment as the non-transitory computer-readable storage medium of the present disclosure stores the program(s) 111 that causes, of the electronic timepiece 1 that is used by being worn on the body of a user and includes the vibrator 16 that vibrates the electronic timepiece 1 and a sensor(s) included in the sensor unit 17 that detects a physical quantity that fluctuates according to the intensity of the vibration of the electronic timepiece 1, the CPU 10 as a computer to determine the wear state of the electronic timepiece 1 on the body of the user based on the detected physical quantity. Thus, the program(s) 111 enables the electronic timepiece 1 to perform the wear state determination using the vibrator 16 and the sensor unit 17 (triaxial accelerometer 171), which the electronic timepiece 1 is standardly equipped with. This can realize the wear state determination function while avoiding complication of the configuration of the electronic timepiece 1 and increase in costs.

Others

Those described in the above embodiment are not limitations but examples of the electronic device, the control method for the electronic device and the non-transitory computer-readable storage medium storing the program(s) of the present disclosure.

For example, in the above embodiment, the physical quantity that fluctuates according to the intensity of the vibration of the electronic timepiece 1 is the acceleration, but not limited thereto.

Further, the vibration intensity of the vibrator 16 in the state in which the electronic timepiece 1 is being worn by the user may be changeable with a user operation. Each of the first threshold value T1/Ta1 and the second threshold value T2/Ta2 may also be changeable with a user operation.

Further, in the above embodiment, the wear state determination is incorporated in each of the pulse rate measurement, the notification and the settlement, but the purpose and the execution timing of the wear state determination are not limited to those described in the above embodiment. For example, the wear state determination may be performed regularly so that the duration of the electronic timepiece 1 being worn by the user may be measured on the basis of the determination results.

Further, in the above, the non-transitory computer-readable storage medium storing the program(s) of the present disclosure is the memory 11, but not limited thereto. The non-transitory computer-readable storage medium may be an information storage medium, such as an HDD (Hard Disk Drive), an SSD (Solid State Drive), a flash memory or a CD-ROM. Further, as a medium to provide data of the program(s) of the present disclosure via a communication line, a carrier wave may be used.

It is a matter of course that the detailed configuration and operation (actions) of each component of the electronic timepiece 1 in the above embodiment can be changed appropriately without departing from the scope of the present disclosure.

Although one or more embodiments of the present disclosure have been described above, the scope of the present disclosure is not limited to the embodiments above but includes the scope of claims below and the scope of their equivalents.

The invention claimed is:

1. An electronic device that is used by being worn on a body of a user, comprising:

a vibrator configured to vibrate the electronic device, a sensor configured to detect a physical quantity corresponding to an intensity of the vibration of the electronic device; and a processor configured to determine a wear state of the electronic device on the body of the user based on the detected physical quantity, wherein the processor determines that the electronic device is worn when the detected physical quantity is less than a first threshold value, and determines that the electronic device is not worn when the detected physical quantity is equal to or greater than the first threshold value.

2. The electronic device according to claim 1, wherein the sensor is configured to detect the physical quantity that becomes larger as the intensity of the vibration of the electronic device increases, and wherein the processor is configured to cause the vibrator to vibrate and determine the wear state based on a determination value corresponding to a magnitude of the physical quantity detected by the sensor in a vibration period in which the vibrator is vibrating.

3. The electronic device according to claim 2, wherein the sensor includes an accelerometer configured to detect an acceleration of the electronic device, and wherein the physical quantity is a fluctuation range of the acceleration, an amplitude of the acceleration, or an absolute value of at least one of a local maximum and a local minimum of the acceleration.

4. The electronic device according to claim 2, wherein the processor is configured to determine that the electronic device is in a normal wear state in which the electronic device is being worn normally on the body of the user in response to the determination value being less than a second threshold value.

5. The electronic device according to claim 1, wherein in response to the determination value being less than the first threshold value and equal to or more than a second threshold value that is smaller than the first threshold value, the processor is configured to determine that the electronic device is neither in a normal wear state in which the electronic device is being worn normally on the body of the user nor in a no-wear state in which the electronic device is not being worn on the body of the user.

6. The electronic device according to claim 1, further comprising a notifier configured to perform notification to the user, wherein the processor is configured to determine that the electronic device is not being worn on the body of the user and cause the notifier not to act in response to the determination value in the vibration period being equal to or more than the first threshold value.

7. The electronic device according to claim 1, further comprising a biometric data measurer configured to measure biometric data on the user, wherein the processor is configured to determine that the electronic device is not being worn on the body of the user and cause the biometric data measurer not to act in response to the determination value in the vibration period being equal to or more than the first threshold value.

8. The electronic device according to claim 1, wherein the vibration period includes a plurality of vibration periods, and wherein the processor is configured to:

perform vibration control to cause the vibrator to vibrate and vibration stop control to cause the vibrator to stop vibrating; and in response to the determination value in a vibration period among the plurality of vibration periods being equal to or more than the first threshold value, determine that the electronic device is not being worn on the body of the user and reduce an intensity of the vibration of the vibrator for the vibration control next time.

9. The electronic device according to claim 8, wherein in determining the wear state that the processor performs after reducing the intensity of the vibration of the vibrator, the processor is configured to determine whether the electronic device is being worn on the body of the user based on the first threshold value that has been corrected according to a degree of the reduction of the intensity of the vibration of the vibrator.

10. The electronic device according to claim 1, wherein the vibration period includes a plurality of vibration periods, and wherein in response to the determination value in a vibration period among the plurality of vibration periods being equal to or more than the first threshold value, the processor is configured to determine that the electronic device is not being worn on the body of the user and reduces an intensity of the vibration of the vibrator for notification to the user.

11. The electronic device according to claim 1, wherein the processor is configured to:

cause the vibrator to vibrate to perform notification to the user; and determine the wear state based on the physical quantity detected by the sensor in response to the vibration of the vibrator for the notification.

12. A control method for an electronic device, comprising:

detecting, by a sensor, a physical quantity corresponding to an intensity of vibration of the electronic device; and determining, by a processer, a wear state of the electronic device on a body of a user based on the detected physical quantity, wherein the processor determines that the electronic device is worn when the detected physical quantity is less than a first threshold value, and determines that the electronic device is not worn when the detected physical quantity is equal to or greater than the first threshold value.

13. A non-transitory computer-readable storage medium storing a program that causes, of an electronic device that is used by being worn on a body of a user and including a vibrator that vibrates the electronic device and a sensor that detects a physical quantity corresponding to an intensity of the vibration of the electronic device, a computer to:

determine, by a processer, a wear state of the electronic device on the body of the user based on the detected physical quantity, wherein the processor determines that the electronic device is worn when the detected physical quantity is less than a first threshold value, and determines that the electronic device is not worn when the detected physical quantity is equal to or greater than the first threshold value.

14. The electronic device according to claim 1, wherein the sensor is configured to detect the physical quantity that becomes larger as the intensity of the vibration of the electronic device increases, and wherein the processor is configured to cause the vibrator to vibrate and determine the wear state by comparing a determination value corresponding to a magnitude of the physical quantity detected by the sensor in a vibration period in which the vibrator is vibrating with a first threshold value and a second threshold value smaller than the first threshold value.

15. The electronic device according to claim 14, wherein by comparing the determination value with the first threshold value and the second threshold value, the processor is configured to determine which one of at least three wear states the electronic device is in, the at least three wear states including a normal wear state in which the electronic device is being worn normally, a no-wear state in which the electronic device is not being worn on the body of the user, and a loose wear state in which the electronic device is being worn loosely as compared with in the normal wear state.

16. The electronic device according to claim 15, wherein in response to the determination value being less than the first threshold value and equal to or more than the second threshold value, the processor is configured to determine that the electronic device is in the loose wear state and perform control to notify the user that the electronic device is in the loose wear state.

17. The electronic device according to claim 6, wherein the notifier is configured to perform the notification using the vibration of the vibrator and the notification using not the vibration of the vibrator but another, and wherein in response to a notification event having occurred, the processor is configured to perform control to perform the notification using the vibration of the vibrator, determine the wear state based on the physical quality detected by the sensor in response to the vibration of the vibrator for the notification, and determine based on a result of the determination of the wear state whether to perform control to perform the notification using not the vibration of the vibrator but another.

* * * * *